US012677740B2

(12) United States Patent
Natarajan et al.

(10) Patent No.: US 12,677,740 B2
(45) Date of Patent: Jul. 14, 2026

(54) HARVESTING SYSTEM FOR A VARIETY OF GRAIN CROPS

(71) Applicant: Mahindra and Mahindra Limited, Chengalpattu (IN)

(72) Inventors: Saravanan Natarajan, Chennai (IN); Partha Sarathi Singha, Chennai (IN); Pavithra Sundaram, Chennai (IN); Sivakumar Arumugam, Chennai (IN); Loganathan Gobi Subramanian, Chennai (IN); Jesuraj Velanganni, Chennai (IN); Senthil Kumar Sundaravarathan Bhavani, Chennai (IN); Ajay Mangadu Natteri, Chennai (IN); Jayalakshmi Surendran, Chennai (IN)

(73) Assignee: Mahindra and Mahindra Limited, Chengalpattu (IN)

( * ) Notice: Subject to any disclaimer, the term of this patent is extended or adjusted under 35 U.S.C. 154(b) by 860 days.

(21) Appl. No.: 17/913,891

(22) PCT Filed: Jul. 19, 2021

(86) PCT No.: PCT/IB2021/056486
§ 371 (c)(1),
(2) Date: Sep. 23, 2022

(87) PCT Pub. No.: WO2022/208150
PCT Pub. Date: Oct. 6, 2022

(65) Prior Publication Data
US 2023/0337580 A1    Oct. 26, 2023

(30) Foreign Application Priority Data

Mar. 31, 2021    (IN) .............................. 202141015056

(51) Int. Cl.
*A01D 41/127*    (2006.01)
*H04L 67/12*    (2022.01)
(52) U.S. Cl.
CPC .......... *A01D 41/1275* (2013.01); *H04L 67/12* (2013.01)
(58) Field of Classification Search
CPC .. A01D 41/1275; A01D 41/00; A01D 41/127; A01D 41/1273; A01D 75/00;
(Continued)

(56) References Cited

U.S. PATENT DOCUMENTS

| 5,488,817 A | 2/1996 | Paquet et al. |
| 2006/0155449 A1* | 7/2006 | Dammann ........... A01D 41/127 |

(Continued)

FOREIGN PATENT DOCUMENTS

JP    3782371 B2    6/2006

OTHER PUBLICATIONS

International Search Report of PCT/IB2021/056486 mailed Sep. 21, 2021.
(Continued)

*Primary Examiner* — Ellis B. Ramirez
(74) *Attorney, Agent, or Firm* — Collard & Roe, P.C.

(57) ABSTRACT

The present disclosure relates to a harvesting system for variety of grain crops. The harvesting system comprises a harvester control unit, a grain loss monitoring GLM-ECU, a cloud communication interface ECU, a plurality of sensors, a controller area network (CAN), a buzzer/alarming device, a display unit, a cloud and a mobile application. The GLM-ECU is configured to process signals from a sieve sensor and a straw walker sensor. The harvester control unit is configured to process signals received from the plurality of sensors and the cloud communication interface ECU serves as an interface to interchange the data between the
(Continued)

harvester control unit and the cloud. The harvester system results in increase in productivity and trust among the stake holders by virtue of real-time information sharing.

9 Claims, 4 Drawing Sheets

(58) Field of Classification Search
CPC .... G05D 2107/21; G05D 9/00; G05D 1/0287;
G05D 1/667; G05D 1/69; H04L 67/12
USPC ..... 701/50, 29.3, 31.4, 32.7, 34.4; 705/7.23,
705/7.58; 56/10.1, 10.2 R
See application file for complete search history.

(56) References Cited

U.S. PATENT DOCUMENTS

| | | | | |
|---|---|---|---|---|
| 2010/0274452 A1* | 10/2010 | Ringwald | ............ | A01B 69/008 |
| 2013/0166344 A1* | 6/2013 | Grothaus | ............... | G06Q 50/02 |
| 2014/0083556 A1* | 3/2014 | Darr | .................... | A01D 43/087 |
| 2015/0269790 A1* | 9/2015 | Batcheller | .............. | B60K 35/22 |
| 2015/0323913 A1* | 11/2015 | Gilmore | ............. | G05B 19/4189 |
| 2015/0348419 A1* | 12/2015 | Matthews | ................ | G08G 1/20 |
| 2016/0073275 A1* | 3/2016 | Inoue | ...................... | E02F 9/264 |
| 2016/0086291 A1* | 3/2016 | Hunt | .................... | A01D 41/127 |
| 2018/0018723 A1* | 1/2018 | Nagla | ................... | H04L 63/102 |
| 2018/0271015 A1* | 9/2018 | Redden | .................... | G06N 3/08 |
| 2018/0359918 A1 | 12/2018 | Blank et al. | | |
| 2020/0167703 A1* | 5/2020 | Tatge | ..................... | H04L 67/52 |
| 2020/0334924 A1* | 10/2020 | Wells | ..................... | H04L 67/04 |
| 2021/0195840 A1* | 7/2021 | Puryk | ................... | A01D 90/10 |
| 2022/0142048 A1* | 5/2022 | Aesaert | ................ | A01F 12/442 |

OTHER PUBLICATIONS

Notification of Transmittal of the International Search Report and the Written Opinion of the International Searching Authority, or Declaration of PCT/IB2021/056486 mailed Sep. 21, 2021.
Written Opinion of the international Search Authority PCT/IB2021/056486 mailed Sep. 21, 2021.

* cited by examiner

HARVESTING SYSTEM FOR A VARIETY OF GRAIN CROPS

CROSS REFERENCE TO RELATED APPLICATIONS

This application is the National Stage of PCT/IB2021/056486 filed on Jul. 19, 2021, which claims priority under 35 U.S.C. § 119 of Indian Application No. 202141015056, filed on Mar. 31, 2021, the disclosure of which is incorporated by reference. The international application under PCT article 21(2) will be published in English.

FIELD

The present disclosure relates to a crop harvesting system that is capable of harvesting a variety of grain crops. In particular, it relates to a harvesting system to sense and process real-time information.

Definitions

As used in the present disclosure, the following terms are generally intended to have the meaning as set forth below, except to the extent that the context in which they are used indicates otherwise.

HARVESTING SYSTEM: The term "harvesting system" hereinafter refers to a versatile device or a machine designed to harvest a variety of grain crops. The harvesting system is configured to reap, thresh, gather and winnow into a single process.

ELECTRONIC CONTROL UNIT (ECU): The term "electronic control unit" refers to a device responsible for monitoring, processing and altering the operation of a system so as to control and optimize the performance of the system. It controls a series of actuators to perform an action to ensure better functioning of the system.

CONTROLLER AREA NETWORK (CAN): The term "controller area network" refers to a communication system composed of different microcontrollers and ICs to communicate with each other and gather real time information. CAN networks can be used as an embedded/on-board communication system for microcontrollers as well as an open communication system for smart devices.

The above definitions are in addition to those expressed in the art.

BACKGROUND

The background information herein below relates to the present disclosure but is not necessarily prior art.

A combined harvesting machine is a versatile machine which is generally used for reaping, threshing, and winnowing of different varieties of grain crops. Harvesting of crops by using these types of versatile machines involves different stakeholders such as farmers, drivers, owners, and brokers. These harvesting machines are primarily rental machines which are lent by the owner to a broker, a driver or a farmer on a need basis.

However, the currently available harvesting machines involve many drawbacks, which create trouble to the users. The harvesting machine is unable to give the real time information about fuel consumption, work or route data, productivity, speed and work efficiency. Further, it also fails to provide data related to the amount of grain loss, grain left inside the grain tank, billing, fuel refill status, driving parameters, and unloading status to the stakeholders. Due to lack of aforementioned real-time information, it creates many problems in financial transactions between different stakeholders and thus results in loss of trust.

There is, therefore, felt the need of a harvesting system for a variety of grain crops that alleviates the above-mentioned drawbacks.

OBJECTS

Some of the objects of the present disclosure, which at least one embodiment herein satisfies, are as follows:

An object of the present disclosure is to provide a harvesting system for a variety of grain crops.

An object of the present disclosure is to provide a harvesting system for a variety of grain crops which senses and provides data in real-time.

Another object of the present disclosure is to provide a harvesting system for a variety of grain crops which provides real time position tracking of the system.

Yet another object of the present disclosure is to provide a harvesting system for a variety of grain crops that enables remote access and control of the system.

Another object of the present disclosure is to provide a harvesting system for a variety of grain crops that provides information on fuel usage and refueling status.

Still another object of the present disclosure is to provide a harvesting system for a variety of grain crops that enables access to real time data through a mobile-based application.

Yet another object of the present disclosure is to provide a harvesting system for a variety of grain crops that provides information related to the amount of grain lost or the amount of grain left inside the tank.

Another object of the present disclosure is to provide a harvesting system for a variety of grain crops that provides real time information related to drive parameters such as oil pressure, temperature, and speed.

Yet another object of the present disclosure is to provide a harvesting system for a variety of grain crops that provides real time information related to the productivity and performance of the harvesting system.

Other objects and advantages of the present disclosure will be more apparent from the following description, which is not intended to limit the scope of the present disclosure.

SUMMARY

The present disclosure envisages a harvesting system for a variety of grain crops. The system comprises of a plurality of sensors connected to a respective electronic control unit (ECUs) by means of a controller area network (CAN). The output data from the CAN network is routed to a cloud which is remotely accessed using a mobile or web based application.

In accordance with one aspect of the disclosure, the harvesting system comprises a grain level sensor for sensing grain-based characteristics of the harvesting system; a grain loss monitoring electronic control unit (GLM-ECU) configured for processing signals received from a sieve sensor and a straw walker sensor; a harvester control unit configured to process the signals received from a plurality of sensors, including the grain level sensor, a fuel level sensor, a vehicle speed sensor, a thresher switch sensor and an unloading lever switch sensor. A cloud communication interface ECU is configured to facilitate communication between the harvester control unit and a cloud. A display unit is communicably coupled to the harvester control unit and is configured to display real-time parameters related to grains and the harvesting system.

In an embodiment, the cloud communication interface ECU is an artificial intelligence (AI) based control unit which exchanges the data via a controller area network (CAN) to said cloud.

In an embodiment, the outputs of the sieve sensor and the straw walker sensor are connected to the GLM-ECU, while the outputs of the grain level sensor, the fuel level sensor, the vehicle speed sensor, the thresher switch sensor and the unloading lever switch sensor are connected to the harvester control unit by means of the CAN network.

In an embodiment, the cloud communication interface ECU is configured to share the functional parameters that include the level of grain in grain-tank, fuel level, fuel consumption, travelling speed, grain loss monitor, thresher level engagement for productivity monitoring and the number of unloading cycles of the harvesting system with a user via a display and mobile app.

In an embodiment, wherein said cloud communication interface ECU is configured to send system-alerts to a user via app, displays, indicators, and alarms, said system-alerts including information related to engine speed, oil pressure, battery status, and engine temperature.

In an embodiment, the data from the cloud is accessed by a user via a data driven mobile-based application or a web-based application. The application is configured to display the real time parameters related to functioning and productivity of the harvesting system, wherein the real time parameters are used to remotely track/control the harvesting system.

In an embodiment, a display unit is provided inside a user cabin and is configured to display the real time information related to the productivity, area covered, fuel consumption, distance travelled, alerts from the harvester control unit, fuel level inside fuel tank, thresher switch status, unloading switch status, unloading count, type of grain selected for harvesting, and grain loss percentage.

In an embodiment, the display unit is selected from the group of devices consisting of a mobile, a tablet, an LCD screen, and a smart watch.

In an embodiment, the cloud is configured to store historical data for analysis and scheduling maintenance activities.

A user is an individual belonging to the group consisting of farmers, drivers, operators, harvester owners, and brokers.

In another embodiment, a mobile based application is configured to provide system-alerts to a user, wherein the alerts includes information related to engine speed, oil/coolant pressure, battery status, and coolant temperature.

BRIEF DESCRIPTION OF THE ACCOMPANYING DRAWING

A harvesting system for a variety of grain crops of the present disclosure will now be described with the help of the accompanying drawing, in which.

LIST OF REFERENCE NUMERALS USED IN DETAILED DESCRIPTION AND DRAWING

400—Harvesting system
300—Display unit
200—Mobile application or web application
150—Buzzer/alarming device
100 Cloud
95—Vehicle parameter
90—Cloud communication interface ECU
85—Grain loss monitoring ECU (GLM-ECU)
80—Controller area network (CAN)
75—Harvester control unit
70—Straw walker sensor
60 Grain loss sieve sensor
50—Thresher switch sensor
40—Unloading lever-switch sensor
30—Vehicle speed sensor
20—Fuel level sensor
10—Grain level sensor

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a", "an", and "the" may be intended to include the plural forms as well, unless the context clearly suggests otherwise. The terms "comprises", "comprising", "including", and "having", are open ended transitional phrases and therefore specify the presence of stated features, steps, operations, elements, modules, units and/or components, but do not forbid the presence or addition of one or more other features, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

When an element is referred to as being "mounted on", "engaged to", "connected to", or "coupled to" another element, it may be directly on, engaged, connected or coupled to the other element. As used herein, the term "and/or" includes any and all combinations of one or more of the associated listed elements.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

Figure 1:
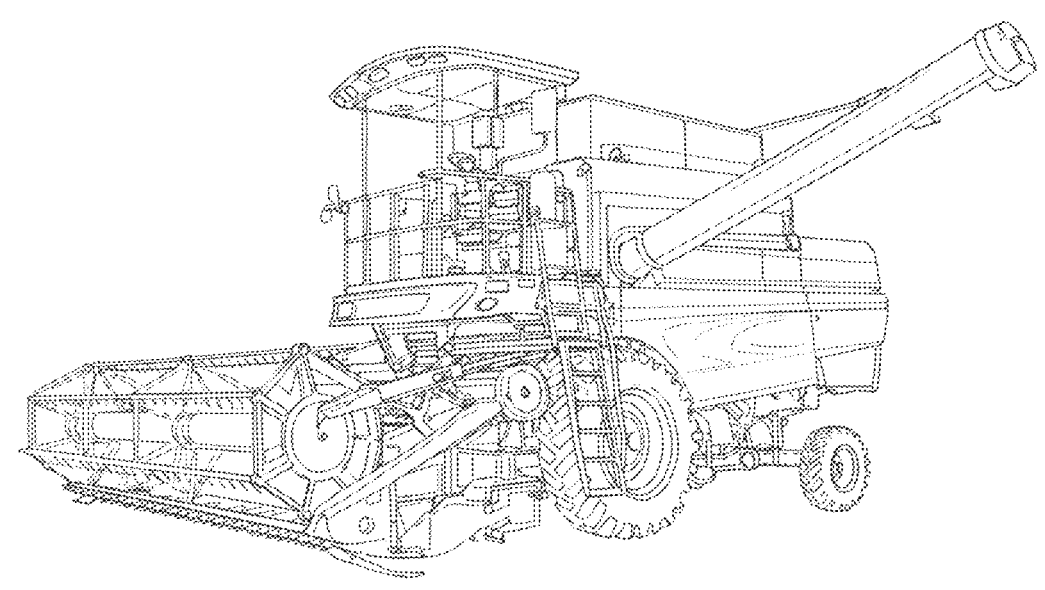
FIG. 1 shows a conventional harvesting machine.

The conventional harvesting machine is shown in FIG. 1.

The present disclosure is related to a harvesting system 400 to harvest a variety of grain crops. The harvesting system 400 comprises three electronic control units (ECU): a harvester control unit 75, a grain loss monitoring ECU 85, a cloud communication interface ECU 90, a plurality of sensors, a communication or a transmission network, a buzzer/alarming device 150, a display unit 300, a cloud (for storage) 100 and a software application to access information remotely.

Figure 2:
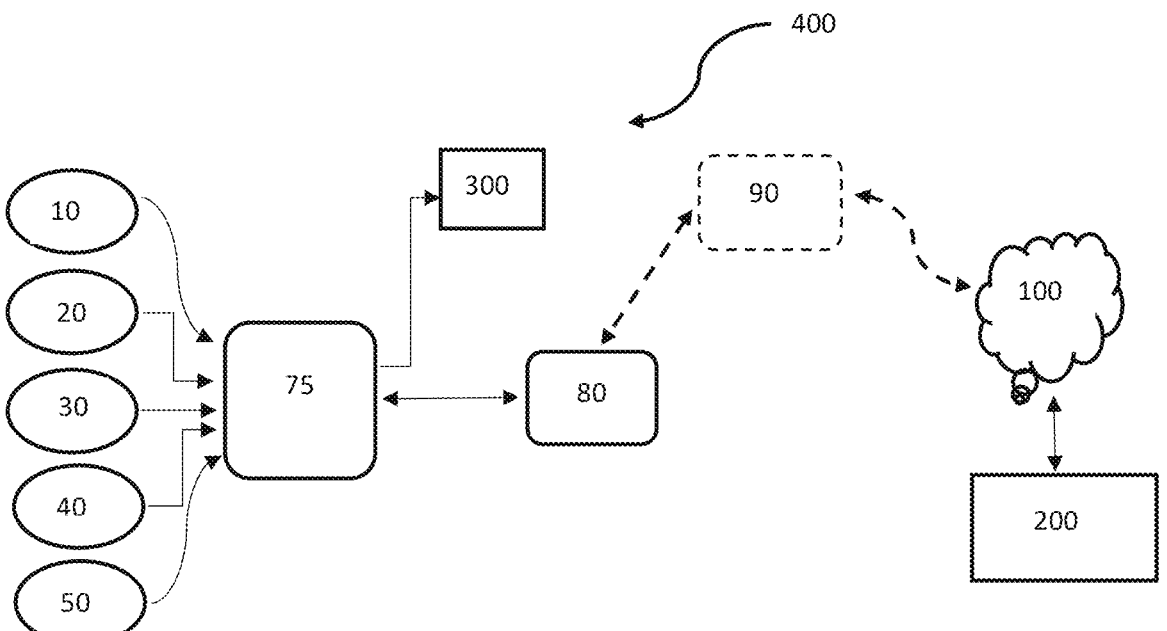
FIG. 2 shows a block diagram a harvesting system with a harvester control unit attached with a plurality of sensors and processing data to a cloud as per an embodiment of the present disclosure.

The harvesting system 400 of the present disclosure is explained with reference to FIG. 2. As shown in FIG. 2, the harvesting system 400 comprises a harvester control unit 75 which processes the received signals of the plurality of sensors. The harvester control unit 75 takes the input signal from a fuel level sensor 20, a grain level sensor 10, a vehicle speed sensor 30, a thresher switch sensor 50 and an unloading lever-switch sensor 40.

The grain level sensor 10 senses the grain level inside the grain tank, the fuel level sensor 20 senses the fuel remaining inside the fuel tank. Further, the thresher switch sensor 50 detects the start and stop of harvesting operation and the unloading lever-switch sensor 40 enables the user to pre-estimate the grain unloading. The harvester control unit 75 automatically counts the number of unloading per day based on the unloading lever-switch sensor 40.

The input signal received from the plurality of sensors is processed by the harvester control unit 75 and communicated to the cloud 100 through a cloud communication interface ECU 90. The cloud communication interface ECU 90 is an artificial intelligence (AI) based architecture that acts as an interface to interchange data between the harvester control unit 75 and the cloud 100.

Further, the communication between the harvester control unit 75 and the cloud communication interface ECU 90 takes place by means of a controller area network (CAN) 80. The data sensed by the plurality of sensors is processed by the harvester control unit 75 and transmitted to the cloud 100 in real-time basis. The stored data from the cloud 100 is accessed using a mobile or web based application 200.

The harvesting system 400 includes the display unit 300 mounted inside the driver or user cabin that is in communication with the harvester control unit 75. The display unit 300 of the harvesting system 400 is configured to display real-time information.

The real-time information of the harvesting system 400 includes productivity in hectare per hour and acre per hour, area covered, fuel consumption in liter per acre, distance travelled, alerts of the harvester control unit 75, fuel level in tank, thresher switch status, unloading switch status, unloading count, type of grain selected for harvesting, grain loss percentage for the sieve sensor 60 and the straw walker sensor 70, which is displayed to the user on the display unit 300.

Further, the display unit 300 is selected from the group of devices consisting of a mobile, a tablet, a mini-computer, an LCD screen, and a smart watch which are configured to display information to a user.

As per one embodiment of the present disclosure, the harvesting system 400 includes the grain loss monitoring ECU (GLM-ECU) 85. The GLM-ECU 85 takes the input signals from the straw walker sensor 70 and the sieve sensor 60 which is configured to indicate the grain loss taking place in the harvesting system 400 as indicated in FIG. 3.

Figure 3:
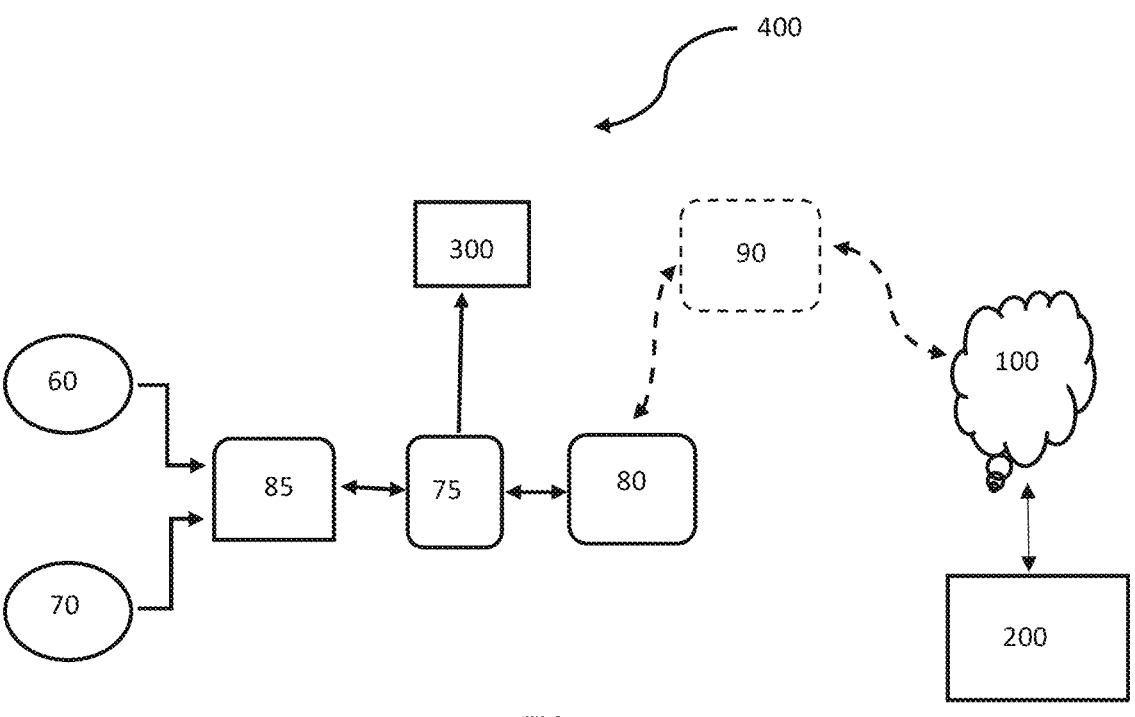
FIG. 3 shows a block diagram of a harvesting system with a grain loss monitoring control unit attached with a grain loss sieve sensor and a straw walker sensor and processing to the cloud as per another embodiment of the present disclosure.

As shown in FIG. 3, the straw walker sensor 70 and the sieve sensors 60 are in connection with the GLM-ECU 85, which processes the sensed data of the respective sensor. The processed data from the GLM-ECU 85 is communicated to the harvester control unit 75 which further processes the data to display over the display unit 300 and transmits the same data to the cloud 100 by means of the CAN 80 for remote monitoring.

Figure 4:
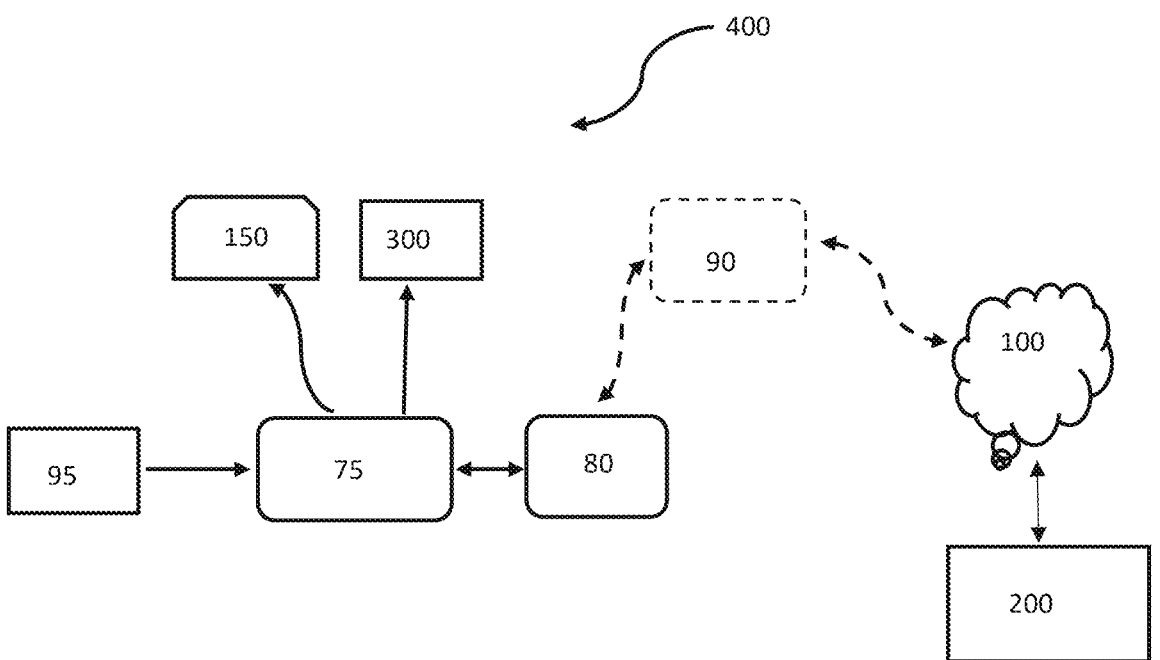
FIG. 4 shows a block diagram illustrating the processing of vehicle parameters to the cloud as per another embodiment of the present disclosure.

As per another embodiment of the present disclosure, the harvester control unit 75 is coupled with a hardware input, which is configured to indicate vehicle parameters 95 such as sudden rise or fall in fuel level, battery charging or discharging, low fuel alert, high RPM alert, coolant temperature alert and oil pressure alert which is shown in FIG. 4. The sensed and processed data from the harvester control unit 75 is transmitted to the cloud 100 via the cloud communication interface ECU 90.

Further, the harvesting system 400 is also equipped with a buzzer/alarming device 150 which is configured to indicate any type of fault which may occur during the operation of the harvesting system 400.

According to the embodiments as discussed above, the cloud communication interface ECU 90 is configured to share functional parameters which include grain tank level, fuel level, fuel consumption, travelling speed, grain loss monitor, thresher level engagement for productivity monitoring and the number of times unloading of grain tank of the harvesting system 400 with the user via display and/or mobile app.

The grain level sensor 10 senses the grain level in the tank at any particular instant and indicates the same to the user so that one can pre-plan the unloading cycle and location. The fuel level sensor 20 senses the fuel level and the rate of fuel consumption. The fuel level indication also notifies the user about sudden rise or drop in the fuel level.

The travelling speed of the harvesting system 400 must be maintained at an optimum level for different crops, which is sensed by the vehicle speed sensor 30. In addition, the number of times unloading of grain tank is provided, which helps the user in terms of measuring the quantity of grain harvested. Furthermore, based on the crops harvested, grain loss in the sieve and the straw walker monitoring and productivity calculations is also provided to the user. Further, the user is a group of different stakeholders, namely as a farmer, or a driver, or an owner or a broker.

The users of the harvesting system are farmers, owners and operators of harvesters, and traders who are part of the farming eco-system.

In an embodiment, the cloud communication interface ECU 90 is configured to send system-alerts to the user via app, displays, indicators, and alarms. The system-alerts include information related to engine speed, oil pressure, battery status, and engine temperature.

The data from the cloud 100 is accessed by a user via a data driven mobile or web-based application 200. The mobile or web-based application 200 is configured to display the real time parameters related to functioning and productivity of the harvesting system, said real time parameters are used to track and remotely control the harvesting system 400.

The user may be an individual belonging to the group consisting of farmers, drivers, operators, harvester owners, and brokers.

Advantageously, the processed data stored over the cloud 100 are accessed by means of the mobile or web-based application 200 which enables the user to remotely control the operational parameters of the harvesting system 400. The mobile or web-based applications 200 are configured to display real-time parameters, productivity details and the location separately.

Also, the data stored in the cloud 100 is capable of storing historical data which helps the user in process optimization of the harvesting system 400. In addition, if the user owns multiple harvesting systems, then he can also access the data by entering the respective VIN (Vehicle Identification Number) of the harvesting system. The mobile or web-based application 200 also gives provision to search data based on location, owner's registered mobile number, user-defined vehicle or system name, and also by date.

Advantageously, the data driven mobile based application allows the user to control the operation of the harvesting system remotely.

In an embodiment, the harvesting system comprises a sensor in which the sensor is a grain level sensor, a fuel level sensor, a vehicle speed sensor, a thresher switch sensor and an unloading lever switch sensor or combination thereof.

Typically, the ECUs are classified into three types: a grain loss monitoring ECU, a harvester control unit and a cloud communication interface ECU. The grain loss monitoring ECU (GLM-ECU) is configured to process signals received from a sieve sensor and a straw sensor; the harvester control unit is configured to process the signals received from the plurality of sensors and the cloud communication interface ECU serves as an interface to exchange the data between the harvester control unit and the cloud.

In a preferred embodiment, the system consists of a display unit configured to indicate the real-time parameters, the productivity details and location. The real time information includes productivity in hectare per hour and acre per hour, fuel consumption, distance travelled etc. In an embodiment, the cloud is configured to store historical data that helps in comparing the historical data and optimization of the system performance.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

TECHNICAL ADVANCES AND ECONOMICAL SIGNIFICANCE

The present disclosure described herein above has several technical advantages including, but not limited to, the realization of a harvesting system for a variety of grain crops that:

provides the real time system information related to the harvesting system;

provides grain level monitoring and the amount of grain left inside the tank;

provides fuel consumption and refueling status;

provides an indication related to the system parameters such as sudden drop or rise in fuel level, battery charging indication, engine RPM, oil pressure;

provides remote access and control of the harvesting system via the mobile based application;

provides real time information of work status;

monitors the productivity, and on-road or work-route of the harvesting system; and is integrated with cloud-based storage so that the stored data is remotely accessible from anywhere by means of a mobile-based application.

The foregoing description of the specific embodiments so fully reveals the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification the word "comprise", or variations such as "comprises" or "comprising", will be understood to imply the inclusion of a stated element, step, or group of elements, steps, but not the exclusion of any other element, step, or group of elements, steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A harvesting system (400) for a variety of grain crops, said harvesting system (400) comprising:

a grain level sensor (10), said grain level sensor (10) configured to sense grain-based characteristics of said harvesting system (400);

a grain loss monitoring electronic control unit (GLM-ECU) (85), said GLM-ECU (85) configured to process signals received from a sieve sensor (60) and a straw walker sensor (70);

a harvester control unit (75), said harvester control unit (75) configured to process the signals received from a plurality of sensors, including said grain level sensor (10), a fuel level sensor (20), a vehicle speed sensor (30), a thresher switch sensor (50) and an unloading lever-switch sensor (40);

a cloud communication interface ECU (90) configured to transmit signals processed by said harvester control unit (75) to a cloud (100) on real-time basis, said cloud communication interface ECU (90) being an artificial intelligence (AI) based control unit configured to transmit data from said harvester control unit (75) to said cloud (100) via a controller area network (CAN) (80), and further configured to share functional parameters that include the level of grain in grain-tank, fuel level, fuel consumption, travelling speed, grain loss monitor, thresher level engagement for productivity monitoring and the number of unloading cycles of said harvesting system (400) with a user on real-time basis; and a display unit (300) communicably coupled to said harvester control unit (75), said display unit (300) configured to display real-time parameters related to grains and said harvesting system (400).

2. The harvesting system (400) as claimed in claim 1, wherein said signals received from the sieve sensor (60) and the straw walker sensor (70) are connected to said GLM-ECU (85), while said signals received from the grain level sensor (10), the fuel level sensor (20), the vehicle speed sensor (30), the thresher switch sensor (50) and the unloading lever-switch sensor (40) are connected to said harvester control unit (75) by means of said CAN (80) network.

3. The harvesting system (400) as claimed in claim 1, wherein said cloud communication interface ECU (90) is configured to share the functional parameters with the user via said display unit (300) and/or a mobile or web-based application (200).

4. The harvesting system (400) as claimed in claim 3, wherein said cloud communication interface ECU (90) is configured to send system-alerts to the user via mobile or web-based application (200), display unit (300), indicators, and buzzer/alarming device (150), said system-alerts including information related to engine speed, oil pressure, battery status, and engine temperature.

5. The harvesting system (400) as claimed in claim 4, wherein data from said cloud (100) is accessed by the user via the data driven mobile or web-based application (200), said application (200) being configured to display the real-time parameters related to functioning and productivity of said harvesting system, said real-time parameters being used to remotely track/control the harvesting system (400).

6. The harvesting system (400) as claimed in claim 1, wherein said display unit (300) is provided inside a user cabin and is configured to display the real-time parameters related to the productivity, area covered, fuel consumption, distance travelled, alerts from said harvester control unit (75), fuel level inside fuel tank, thresher switch status, unloading switch status, unloading count, type of grain selected for harvesting, and grain loss percentage.

7. The harvesting system (400) as claimed in claim 1, wherein said display unit (300) is selected from the group of devices consisting of a mobile, a tablet, an LCD screen, and a smart watch.

8. The harvesting system (400) as claimed in claim 1, wherein said cloud (100) is configured to store historical data for analysis and scheduling maintenance activities.

9. The harvesting system (400) as claimed in claim 5, wherein the user is an individual belonging to the group consisting of farmers, drivers, operators, harvester owners, and brokers.

* * * * *